US006618667B1

(12) United States Patent
Berwanger et al.

(10) Patent No.: US 6,618,667 B1
(45) Date of Patent: Sep. 9, 2003

(54) METHOD FOR IDENTIFYING EVENTS WHICH COVER MORE THAN ONE SEGMENT USING SEGMENTS

(75) Inventors: Christian Berwanger, Düsseldorf (DE); Swen Van Hauten, Düsseldorf (DE); Ralf Kriesinger, Meerbusch (DE); Stefan Vieweg, Willich (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/868,085

(22) PCT Filed: Dec. 6, 1999

(86) PCT No.: PCT/DE99/03950

§ 371 (c)(1),
(2), (4) Date: Jun. 14, 2001

(87) PCT Pub. No.: WO00/39774

PCT Pub. Date: Jul. 6, 2000

(30) Foreign Application Priority Data

Dec. 14, 1998 (DE) ........................................ 198 59 598
Apr. 13, 1999 (DE) ........................................ 199 17 842

(51) Int. Cl.[7] .......................... G06F 165/00; G08G 1/00

(52) U.S. Cl. ....................... 701/117; 701/210; 701/208; 701/300; 340/905; 340/908; 340/917; 340/825.36; 455/456

(58) Field of Search ................................ 701/117, 210, 701/208, 209; 340/905, 995, 993, 907, 991, 961, 904, 908, 917, 825.36, 988, 934; 455/456, 457

(56) References Cited

U.S. PATENT DOCUMENTS

| | | | | | |
|---|---|---|---|---|---|
| 5,406,490 | A | * | 4/1995 | Braegas | 340/905 |
| 5,648,769 | A | * | 7/1997 | Sato et al. | 340/988 |
| 5,774,073 | A | * | 6/1998 | Maekawa et al. | 340/995 |
| 5,919,246 | A | * | 7/1999 | Waizmann et al. | 701/209 |
| 6,012,012 | A | * | 1/2000 | Fleck et al. | 701/117 |
| 6,298,301 | B1 | * | 10/2001 | Kim | 701/200 |

* cited by examiner

*Primary Examiner*—Thomas G. Black
*Assistant Examiner*—Tuan C To
(74) *Attorney, Agent, or Firm*—Cohen, Pontani, Lieberman & Pavane

(57) ABSTRACT

The transmission of traffic information from a control center to a terminal is optimized with respect to the volume of data to be transmitted by a control center, a terminal, and process for decoding the traffic information pertaining to a highway network transmitted from a traffic control information center to a terminal.

22 Claims, 3 Drawing Sheets

METHOD FOR IDENTIFYING EVENTS WHICH COVER MORE THAN ONE SEGMENT USING SEGMENTS

PRIORITY CLAIM

This is a U.S. national stage of application No. PCT/DE99/03950, filed on Dec. 6, 1999. Priority is claimed on that application and on the following applications Country: Germany, Application No.: 198 59 598.0, Filed: Dec. 14, 1998; and Country: Germany, Application No.: 199 17 842.9, Filed: Apr. 13, 1999.

The invention pertains to a process for decoding traffic information pertaining to a highway network transmitted by radio from a traffic control center to a terminal.

BACKGROUND OF THE INVENTION

Traffic information which is transmitted by radio from a traffic information control center to terminals, which can be in, for example, motor vehicles, can consist of data on conditions such as the travel times, average speeds, etc., prevailing in individual segments (highways, parts of highways, lanes, parts of lanes of highways) of a highway network.

The segments of the part of the highway network to which the traffic information transmitted from the control center to the terminal pertains are usually identified in a set of traffic information by the use of segment-identifying segment data in the transmission which indicate status data representing a certain status (=event) and the segments affected by this status.

The task of the present invention is to optimize the traffic information in the most efficient and reliable and easiest to realize manner and thus to make it possible to reduce the volume of data transmitted.

SUMMARY OF THE INVENTION

The invention makes it possible to reduce the data volume of the traffic information to be transmitted from the traffic control center to the terminal. It is possible to achieve a significant a reduction in the volume of transmitted data by comparing:

segment information in the traffic information currently being received by the terminal is compared with segment information represented in older traffic information previously received by the terminal, which information identifies the segments affected by the status data represented in the traffic information; and also by comparing additional information indicating the travel direction of the affected segments (either additional travel direction information or implicit travel direction information contained in the sequence of transmitted segments or stored segments), the status information of the older traffic information being assigned to the segments of the current traffic information only when the comparison shows that agreement exists. Thus, for example, when, in older traffic information, the statement "traffic jam" has been transmitted and stored as status information and, for example, two segments in a certain sequence have been transmitted and stored as segment information, it is possible for the new, current traffic information being sent by the control center to the terminal to contain only a segment chain which contains at least these two segments in the same sequence. Thus, even if the traffic jam has grown larger or smaller or has expanded at one end and become shorter at the other end, it is possible for the control center to transmit completely decodable traffic information with a smaller data volume simply by identifying the segments (or one segment and its travel direction), there being no need to repeat the specific status information. Instead of a comparison establishing the agreement of only two segments, a comparison establishing the agreement of three, four, five, or more than five segments in the terminal can also be used as the condition for concluding that the status data of the older traffic information also pertain to the segments of the current traffic information. By establishing a uniform set of definition rules in the control center and in the terminal, it becomes possible to create a transmission protocol associated with a reduced volume of data. The uniformity between the control center and the terminal should pertain to the type of agreement required; the set of uniform rules should state in particular whether at least two (or at least three, see above) segments must be in agreement or whether there must be one segment (or two or three or more than three) in agreement plus agreement with respect to additionally transmitted directional information pertaining to the travel direction (or directional information implicit in the travel direction-specific segment number).

The process for decoding can be realized in the terminal either as an electronic circuit, for example, or as a program. It is neither defined nor limited, however, by embodiment as a program.

BRIEF DESCRIPTION OF THE DRAWINGS

Additional features and advantages of the invention can be derived from the subclaims and the following exemplary embodiment, which is described on the basis of the drawing:

DETAILED DESCRIPTION OF THE PREFERRED EMBODIMENTS

Figure 1:
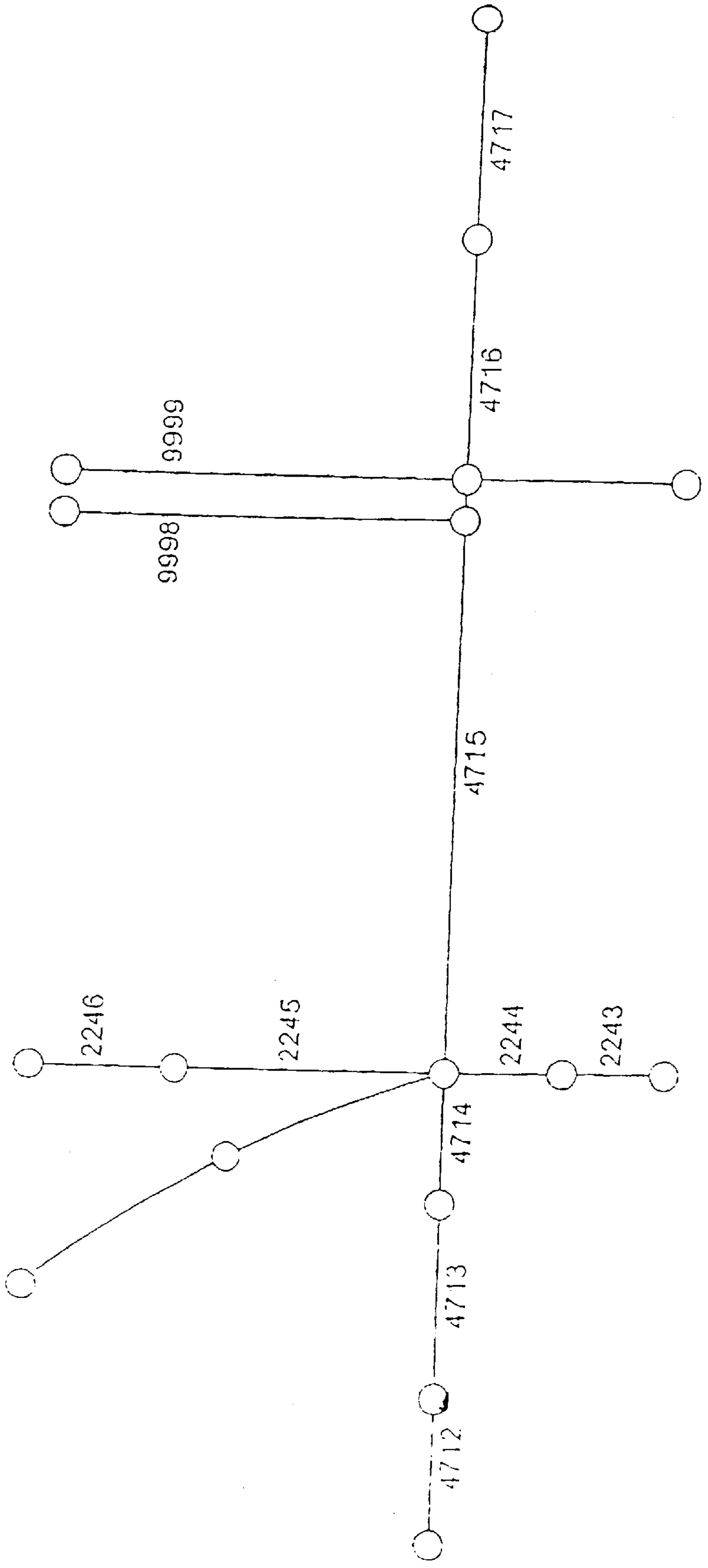
FIG. 1 shows by way of example a highway network simulated on a digital card, divided into sections of highways or segments representing sections of lanes.

FIG. 1 shows a part of a highway network. Highways or sections of highways or lanes or sections of lanes of a highway network can be represented by segments. At least within the area shown, the highway leading from left to right in FIG. 1 is indicated, for example, by the segments 4712, 4713, 4714, 4715, 4716, and 4717. In this case, all the lanes are contained in a segment 4712, i.e., including those for travel in both directions. It is also possible to specify a segment 9998 for one or all of the lanes of a section of highway allowing travel in one direction and another segment 9999 for one or (as here) all lanes of the same section allowing travel in the other direction.

Segments 2243–2246, furthermore, are shown by way of example in the highway leading from top to bottom in FIG. 1. The segment numbers in the transmitted traffic data can be transmitted decoded in a conventional manner; they can be transmitted, for example, with a bit length which can define up to 10,000 segments (14 bits).

Figure 2:
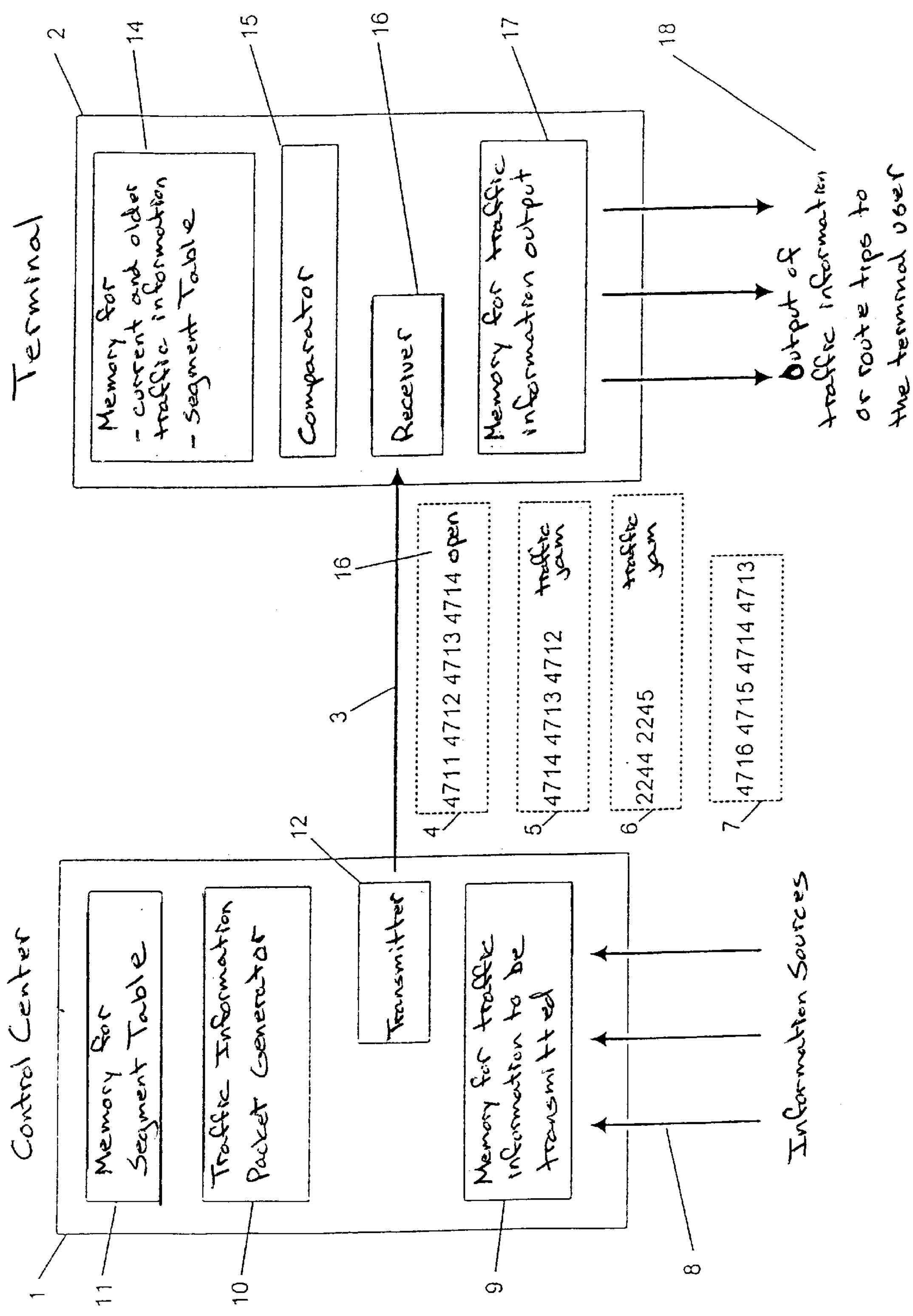
FIG. 2 shows a functional block diagram of a control center, a terminal, and the traffic information transmitted from the control center to the terminal, where it is processed.

FIG. 2 shows by way of example a set of traffic information items 4–7 transmitted from a control center 1 to a terminal 2 over a radio channel 3.

The control center 1 receives traffic information from various information sources, and this information is stored in a memory 9. The information sources 8 can be traffic detectors in the form of floating car data communications devices (FCDs) traveling along with the traffic, stationary detectors installed along the highways of the highway network, historical data, etc. Not shown here are methods for processing the traffic information received from the information sources 8 by interpolation, interpretation, etc., to obtain the traffic information to be sent to the terminals. The information from the memory 9 (possibly after appropriate pre-processing) is encoded into a transmittable form by a traffic information generator 10 with the use of segment tables stored in a memory 11 (for segments of the highway network corresponding to FIG. 1). The traffic information is then sent by the transmitter 12 to the terminal 2. The information can be transmitted in particular by radio, such as by RDS-TMC (Radio Data System—Traffic Message Channel). It can also be transmitted by mobile radio in particular. With mobile radio, both point-to-point transmission and cell broadcast transmission are possible. A cell broadcast transmission in GSM (Global System Mobile communications) can be, for example, a SMS-CB (Short Message Service-Cell Broadcast) transmission. In the case of mobile radio cell broadcast communications (SMS-CB), the set of traffic information 4–7 to be sent by the control center to several terminals 2 can be transmitted in a form which is individualized for specific cells or groups of cells. Thus it is possible, in the radio cells of a mobile radio network, to transmit only the information which is relevant to those cells. In the area of Düsseldorf, for example, it is possible to transmit only the information pertaining to the area of Düsseldorf but no information pertaining to Munich; or on an autobahn, it is possible to transmit only the information pertaining to a certain part of the autobahn in one travel direction but no information pertaining to segments of the autobahn farther away or to autobahn segments allowing travel in the other direction.

The traffic information items 4, 5, 6, 7 are transmitted in the indicated sequence from a control center to all terminals 2 in a certain mobile radio cell or group of mobile radio cells via mobile radio cell broadcast.

The set of traffic information 4, 5, 6 can include, for example, status data pertaining to the status of the segments represented in traffic information items 4–6. Status data can, for example, involve travel times or speeds with a given degree of accuracy. The quantization (=accuracy) can comprise in particular four or five levels such as traffic jam, stop-and-go traffic, slow but moving, light traffic, open highway. In the case of quantization with four levels, transmission in 2 bits is possible, whereas in the case of quantization with fewer than 8 levels, transmission in 3 bits is possible.

The segments to which the status data in a traffic information item 4 pertain are defined in exactly the same way in both the control center 11 and in the terminal 2 by means of a segment table stored in both places. Thus, only the numbers of the segments, i.e., 4711, 4712, 4713, 4714, for the four segments included in traffic information item 4 need to be transmitted. The same is true for traffic information items 5 and 6. In traffic information item 7, however, some or all of the status data are left out of the transmission. In traffic information item 7, therefore, the status data are not transmitted; that is, only the segment data "4716, 4715, 1714, 4713" are transmitted from the control center 1 to the terminal 2. Nevertheless, according to the invention, the terminal is still able to assign certain status data such as "traffic jam", etc., to certain segments of the highway network.

The terminal uses a decoding and comparison device 15 to check traffic information item 7, which has been received by a receiver 16 (for mobile radio or RDS-TMC) and stored in a memory 14 (for older and current traffic information items, segment tables, and status tables), to see whether or not there is agreement in terms of identity between at least one of the segments in the older traffic information items 4, 5, or 6 and one of the segments of the current traffic information item 7 and also to see whether there is agreement in terms of additional information representing the travel direction of affected segments (especially between the current 7 and older 4, 5, 6 traffic information items). This check is conducted by comparing the information of the current traffic information item 7 representing segments and direction individually and in sequence with the older traffic information items 4, 5, 6. In this case, agreement is found between the traffic information item 7 and the older traffic information items 5 and 4 with respect to segment 4714. The position of an additional segment adjacent to the former segment in the sequence of the current transmission is also compared with the positions it occupied previously, as stored in the terminal; in the present case, this adjacent segment is segment 4713. This information represents the direction of the affected lanes in the segments. In traffic information item 4, 4713 was transmitted before 4714, whereas it was transmitted after 4714 in the older traffic information item 5 and in the new traffic information item 7. Thus, the travel direction designated in the older traffic information item 5 is the same as that in the more recent traffic information item 7. Thus, the traffic information items 5 and 7 pertain to at least some of the same sections of the highway. For this reason, it is assumed that the traffic jam represented by the status data in the older traffic information item 5 also pertains to the segments affected by the current traffic information item 7, namely, all of the segments given there (4716, 4715, 4714, 4713). It is assumed, for example, that the traffic jam has shifted to some extent.

When the segments, such as segments 9998 and 9999 according to FIG. 1, are each defined as representing all of the lanes in one travel direction of a section of highway, it is enough for one segment (e.g., 9998) to be found in both the older traffic information and in the current traffic information to establish agreement and to assign the status data of the older traffic information to the segment of the current traffic information, because in this case it takes only a single segment to define the travel direction in the segment. If only one segment is defined for all lanes (even those of different directions) of a section of highway, the travel direction in the lanes of interest must be determined on the basis of the sequence in which the segments are transmitted or by a direction flag transmitted with one of the segments.

When there is at least partial agreement between current and older traffic information with respect to a certain segment and the data implying the travel direction, it is therefore possible to first store 17 and then transmit the current traffic information either with or without the associated status data.

Output 18 in FIG. 2 can be, for example, either optical or acoustic and take the form of traffic jam warnings, etc. The traffic information output 18 can be derived directly, for example, from the transmitted traffic information after it has been decoded. The traffic information output 18 can also comprise navigation tips, which are prepared for the terminal user on the basis of the transmitted traffic information.

Figure 3:
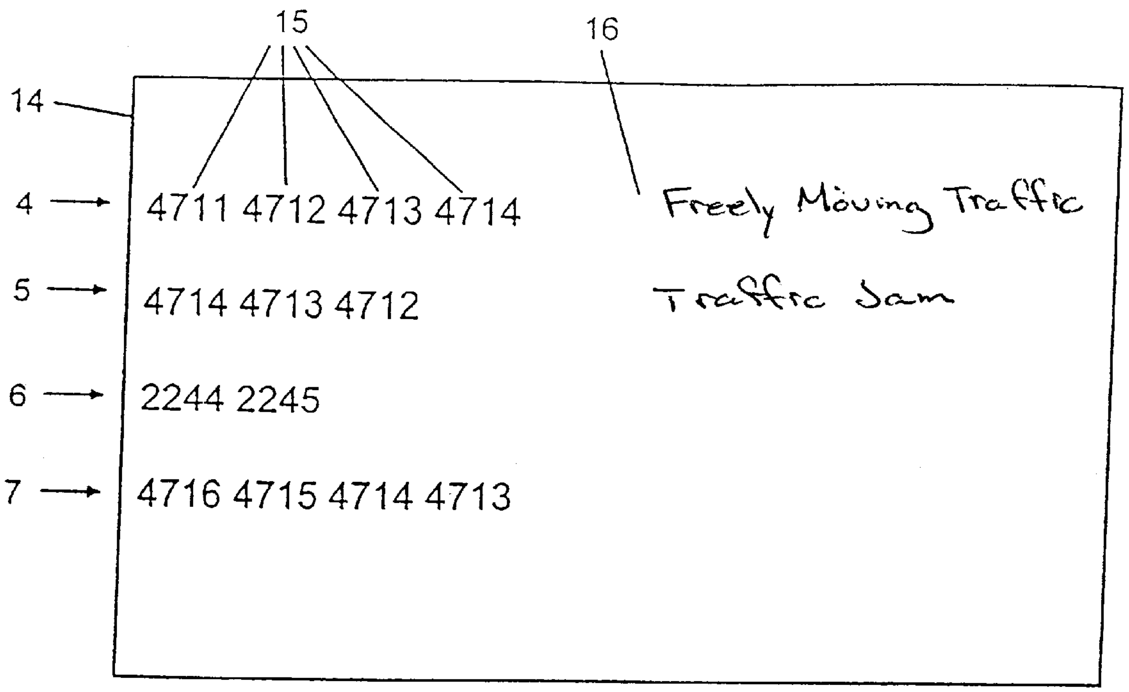
FIG. 3 shows by way of example a list of transmitted traffic information.

FIG. 3 lists the transmitted traffic information items 4–7 in the sequence of their transmission.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A process for decoding traffic information pertaining to a highway network transmitted from a traffic information control center to a terminal, comprising the steps of:

representing status of at least one segment of the highway network and identity of the segment with the transmitted traffic information;

storing segment data in the terminal representing segments included in the traffic information obtained in the transmission, the data being stored in a manner which also represents travel direction in affected lanes of the segments, the terminal also storing status data representing the status of the segments;

comparing, in the terminal, the segments represented in current traffic information that are transmitted to the terminal with segments represented in older traffic information previously transmitted to and stored in the terminal before the current traffic information; and concluding that the status data stored with the older traffic information also pertains to the segments included in the current traffic information and preparing these data for output to the terminal upon establishing agreement with respect to identity between two segments of the older traffic information and two of the segments of the current traffic information and also upon establishing agreement with respect to the travel direction in these segments, so that a message can be sent to the terminal which omits details that are filled in by a message of the older traffic information having two segments that match the two segments of the current information thereby reducing a volume of data transmitted.

2. A process according to claim 1, wherein a segment represents at least one of an entire highway and at least some of the lanes in one direction of a highway in both the traffic information control center and the terminal.

3. A process according to claim 1, wherein a segment represents at least one of a section of a highway and a section of at least one of the lanes in one direction of a highway in both the traffic information control center and the terminal.

4. A process according to claim 1, wherein the status data is quantized in at least two levels and represents at least one of speeds and travel times in at least one segment.

5. A process according to claim 1, wherein the status data represent weather information in at least one segment.

6. A process according to claim 1, wherein the status data represent accidents and detours in at least one segment.

7. A process according to claim 1, including transmitting the traffic information by radio.

8. A process according to claim 7, wherein the traffic information is transmitted by mobile radio.

9. A process according to claim 8, wherein traffic information is transmitted by cell broadcast (GSM-CB 3).

10. A process according to claim 9, wherein the transmitted traffic information is different in different mobile radio cells or groups of mobile radio cells, in that the information is broadcast selectively based on local relevance.

11. A process according to claim 1, wherein several older traffic information items are present in the terminal and each is compared with at least one current traffic information item.

12. A process according to claim 1, wherein several current traffic information items are stored in the terminal.

13. A process according to claim 1, including defining status data of an older traffic information item as current traffic information based on additional information in the current and older traffic information pertaining to travel direction when at least two stored segment identities and their sequence in memory are equal.

14. A process according to claim 13, including defining status data of an older traffic information item as pertaining to segments of a current traffic information item when agreement is found for at least one segment identity and information representing the travel direction of the lane in the segment in question, whether transmitted or already present in the terminal.

15. A process according to claim 1, wherein in the transmitted traffic information on a transmission route from the traffic information control center to the terminal, a chain of several segments in sequence in one travel direction is represented by one of its first and its last segment, by a number of segments in the chain, and by a directional value representing a direction in which the chain extends one of from the first segment and from the last segment.

16. A process according to claim 1, wherein current traffic information is transmitted without status data from the control center to the terminal precisely when at least one of the segments present in the current traffic information agrees with a segment in an older traffic information item.

17. A process according to claim 16, wherein a transmission without status data occurs only when at least two segments in the current status data agree with any previously transmitted older status data.

18. A terminal for decoding traffic information pertaining to a highway network transmitted from a traffic information control center, the terminal comprising:

receiver means for receiving traffic information transmitted by radio from the traffic information control center;

a memory for storing transmitted traffic information; and a comparison device for comparing segments represented in older traffic information with segments represented in current traffic information, the comparison device being operative so that the terminal compares segments represented in current traffic information transmitted to it with segments represented in older traffic information transmitted and stored in the terminal before the current traffic information, whereby upon establishing that two of the segments of the current traffic information are the same as two segments of an older traffic information item and that travel directions are also the same in the compared segments, the status data stored for the older traffic information is defined as pertaining to the segments of the current traffic information and made available as output for a terminal user.

19. A terminal according to claim 18, wherein the receiver is a radio receiver.

20. A terminal according to claim 19, wherein the radio receiver is an RDS-TMC receiver.

21. A terminal according to claim 18, wherein the receiver is a mobile radio receiver for decoding information transmitted by mobile radio.

22. A traffic information control center for decoding traffic information way network, comprising:

a transmitter for transmitting traffic information;

a memory for storing traffic information to be transmitted; and a traffic information packet generator operative so that traffic information currently to be transmitted by the transmitter is derived from segment information designating segments of a highway network without any status information pertaining to traffic in these segments when the status information pertaining to two of these segments was already contained in a previously transmitted older traffic information item, the segment data of which represent two segments which are also included in the current traffic information item, whereas the packet generator otherwise includes the status data of the affected segments in the traffic information currently being transmitted.

* * * * *